United States Patent
Aoki et al.

(10) Patent No.: US 9,696,754 B2
(45) Date of Patent: Jul. 4, 2017

(54) HINGE HAVING MULTIPLE DEGREES OF FREEDOM

(71) Applicant: INTEL CORPORATION, Santa Clara, CA (US)

(72) Inventors: Russell S. Aoki, Tacoma, WA (US); Jeff Ku, Taipei (TW); Sheng-Chao Lin, Taipei (TW)

(73) Assignee: Intel Corporation, Santa Clara, CA (US)

( * ) Notice: Subject to any disclaimer, the term of this patent is extended or adjusted under 35 U.S.C. 154(b) by 91 days.

(21) Appl. No.: 14/225,933

(22) Filed: Mar. 26, 2014

(65) Prior Publication Data

US 2015/0277488 A1    Oct. 1, 2015

(51) Int. Cl.
G06F 1/16    (2006.01)

(52) U.S. Cl.
CPC ............ *G06F 1/162* (2013.01); *G06F 1/1681* (2013.01); *G06F 1/1616* (2013.01); *Y10T 16/545* (2015.01); *Y10T 16/5472* (2015.01); *Y10T 29/24* (2015.01)

(58) Field of Classification Search
CPC ...... G06F 1/162; G06F 1/1681; G06F 1/1616; Y10T 16/545; Y10T 16/5472
USPC ......... 16/337, 224, 342, 366, 368, 375, 382, 16/386; D8/329
See application file for complete search history.

(56) References Cited

U.S. PATENT DOCUMENTS

| | | | |
|---|---|---|---|
| D262,188 S | 12/1981 | Thompson | |
| 4,547,027 A | 10/1985 | Scheibenreif | |
| 6,498,721 B1 | 12/2002 | Kim | |
| 6,532,147 B1 * | 3/2003 | Christ, Jr. | 361/679.27 |
| 6,867,961 B2 * | 3/2005 | Choi | 361/679.06 |
| 7,027,297 B1 | 4/2006 | Mizuno et al. | |
| 7,100,876 B2 | 9/2006 | Tseng et al. | |
| 7,133,280 B2 | 11/2006 | Love | |
| D562,108 S | 2/2008 | Pester et al. | |
| 7,551,431 B2 | 6/2009 | Nakajima | |
| 7,706,137 B2 * | 4/2010 | Iijima et al. | 361/679.07 |
| D628,409 S | 12/2010 | Anzai | |
| 7,916,462 B2 | 3/2011 | Hung | |
| 7,971,321 B2 * | 7/2011 | Chen | H04M 1/0212 16/367 |
| 7,974,084 B2 * | 7/2011 | Chen et al. | 361/679.26 |
| 8,050,030 B2 * | 11/2011 | Wu et al. | 361/679.58 |
| 8,250,713 B2 * | 8/2012 | Lin | 16/367 |
| 8,429,796 B2 | 4/2013 | Nagami | |

(Continued)

FOREIGN PATENT DOCUMENTS

EP    1975762 A1    10/2008

OTHER PUBLICATIONS

Aoki et al., U.S. Appl. No. 29/513,118, filed in the USPTO Dec. 26, 2014, US Application, Drawings, and Filing Receipt dated Jan. 7, 2015 attached (41 pages), not yet published.

(Continued)

*Primary Examiner* — Adrian S Wilson
*Assistant Examiner* — Abhishek Rathod
(74) *Attorney, Agent, or Firm* — International IP Law Group, P.L.L.C.

(57) ABSTRACT

Techniques for forming a hinge are described herein. The hinge is to couple a first housing of a computing device and a second housing of the computing device. The hinge is to cause the first housing to have three degrees of freedom in movement from the second housing.

17 Claims, 6 Drawing Sheets

(56) References Cited

U.S. PATENT DOCUMENTS

| | | |
|---|---|---|
| 8,811,011 B2 | 8/2014 | Tian et al. |
| 8,861,187 B2 | 10/2014 | Takahashi |
| 8,887,356 B2 | 11/2014 | Bailey |
| 8,899,537 B2 | 12/2014 | Kuan et al. |
| 8,955,196 B2 | 2/2015 | Bai |
| D727,734 S | 4/2015 | Kwak et al. |
| 9,086,848 B2 | 7/2015 | Kinoshita et al. |
| 9,146,586 B2 | 9/2015 | Ho et al. |
| 9,223,351 B2 | 12/2015 | Lam |
| D749,341 S | 2/2016 | Mitchell |
| D750,619 S | 3/2016 | Amit et al. |
| 9,342,101 B2 | 5/2016 | Hsu |
| 2003/0193773 A1 | 10/2003 | Choi |
| 2004/0012920 A1* | 1/2004 | Tanimoto et al. ............. 361/683 |
| 2004/0107540 A1* | 6/2004 | Hsu ........................ G06F 1/162 16/366 |
| 2004/0160733 A1 | 8/2004 | Hsu |
| 2005/0198780 A1 | 9/2005 | Liu et al. |
| 2005/0207104 A1 | 9/2005 | Love |
| 2005/0237701 A1* | 10/2005 | Yu ................................. 361/681 |
| 2006/0133020 A1 | 6/2006 | Huang et al. |
| 2006/0168756 A1 | 8/2006 | Sato et al. |
| 2006/0171112 A1 | 8/2006 | Lev et al. |
| 2007/0285883 A1 | 12/2007 | Nakajima et al. |
| 2008/0094792 A1* | 4/2008 | Chen ..................... G06F 1/1616 361/679.06 |
| 2008/0151509 A1* | 6/2008 | Chien ................... G06F 1/1616 361/726 |
| 2008/0253072 A1* | 10/2008 | Tracy et al. ................... 361/681 |
| 2009/0231791 A1 | 9/2009 | Aoyama et al. |
| 2010/0125975 A1 | 5/2010 | Zhang et al. |
| 2010/0154169 A1* | 6/2010 | Chen ................... H04M 1/0212 16/277 |
| 2010/0232102 A1* | 9/2010 | Walker et al. ........... 361/679.27 |
| 2010/0289391 A1 | 11/2010 | Lai |
| 2011/0075340 A1* | 3/2011 | Qin ........................ 361/679.09 |
| 2011/0110027 A1* | 5/2011 | Hu ............................ 361/679.07 |
| 2011/0110670 A1 | 5/2011 | Atkinson |
| 2012/0293938 A1 | 11/2012 | Dai et al. |
| 2013/0128441 A1* | 5/2013 | Lee et al. ................. 361/679.09 |
| 2016/0357225 A1 | 12/2016 | Huang et al. |

OTHER PUBLICATIONS

Aoki et al., U.S. Appl. No. 14/751,752, filed in the USPTO Jun. 26, 2015, US Application, Drawings, and Filing Receipt dated Jul. 10, 2015 attached (33 pages), not yet published.

\* cited by examiner

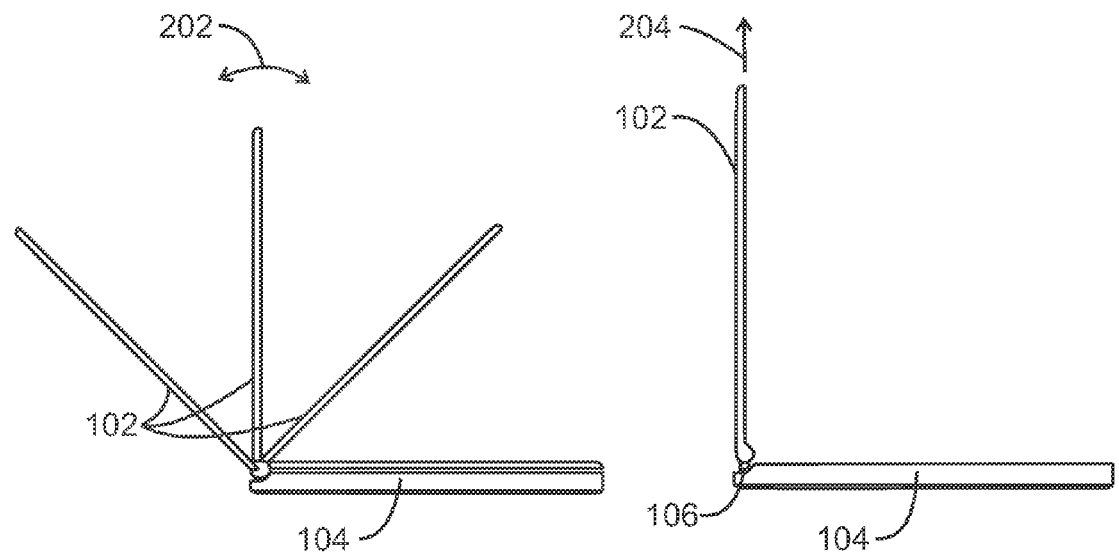
FIG. 2A
FIG. 2B
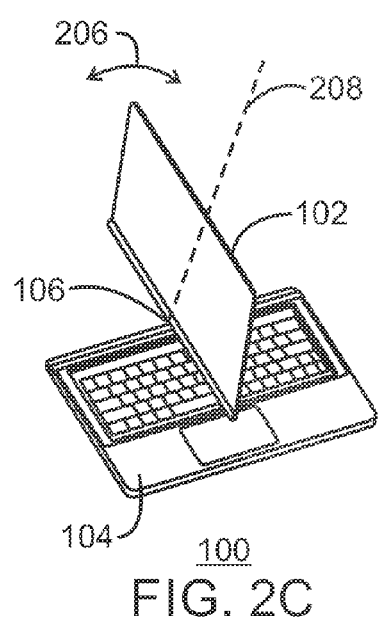
FIG. 2C

HINGE HAVING MULTIPLE DEGREES OF FREEDOM

TECHNICAL FIELD

This disclosure relates generally to hinge mechanisms. More specifically, the disclosure describes a hinge mechanism in a computing device.

BACKGROUND

Computing devices include components configured to move via hinges. For example, a laptop computing device may include a hinge coupling a lid to a base. In some scenarios, the lid may house a display device, while the base may house a keyboard. In this scenario, the display may be visible to a user in an opened position, wherein the laptop may be opened by rotating the lid away from the base by the hinge coupling the lid to the base.

BRIEF DESCRIPTION OF DRAWINGS

FIGS. 2A-2C are diagrams illustrating the computing device with a lid of the computing device in various positions;

DETAILED DESCRIPTION

The subject matter disclosed herein relates to techniques for forming a hinge of a computing device having at least three degrees of freedom. Computing devices may employ hinges to enable movement of housings, such as in a laptop having a lid housing and a base housing. The techniques described herein include a hinge configured to couple a first housing to a second housing, enabling motion of the first housing with respect to the second housing in at least three degrees of freedom.

A housing, as referred to herein, is a component of a computing device configured to house one or more other components. For example, in a laptop, a first housing may include a lid, and a second housing may include a base. The lid may be coupled to the base via a hinge. The hinge may be configured to enable the lid to move in at least three degrees of freedom. For example, the lid may be opened by a rotational motion of the lid with respect to the base, pulled up in a linear motion, and swiveled around the hinge, as discussed in more detail below.

Figure 1:
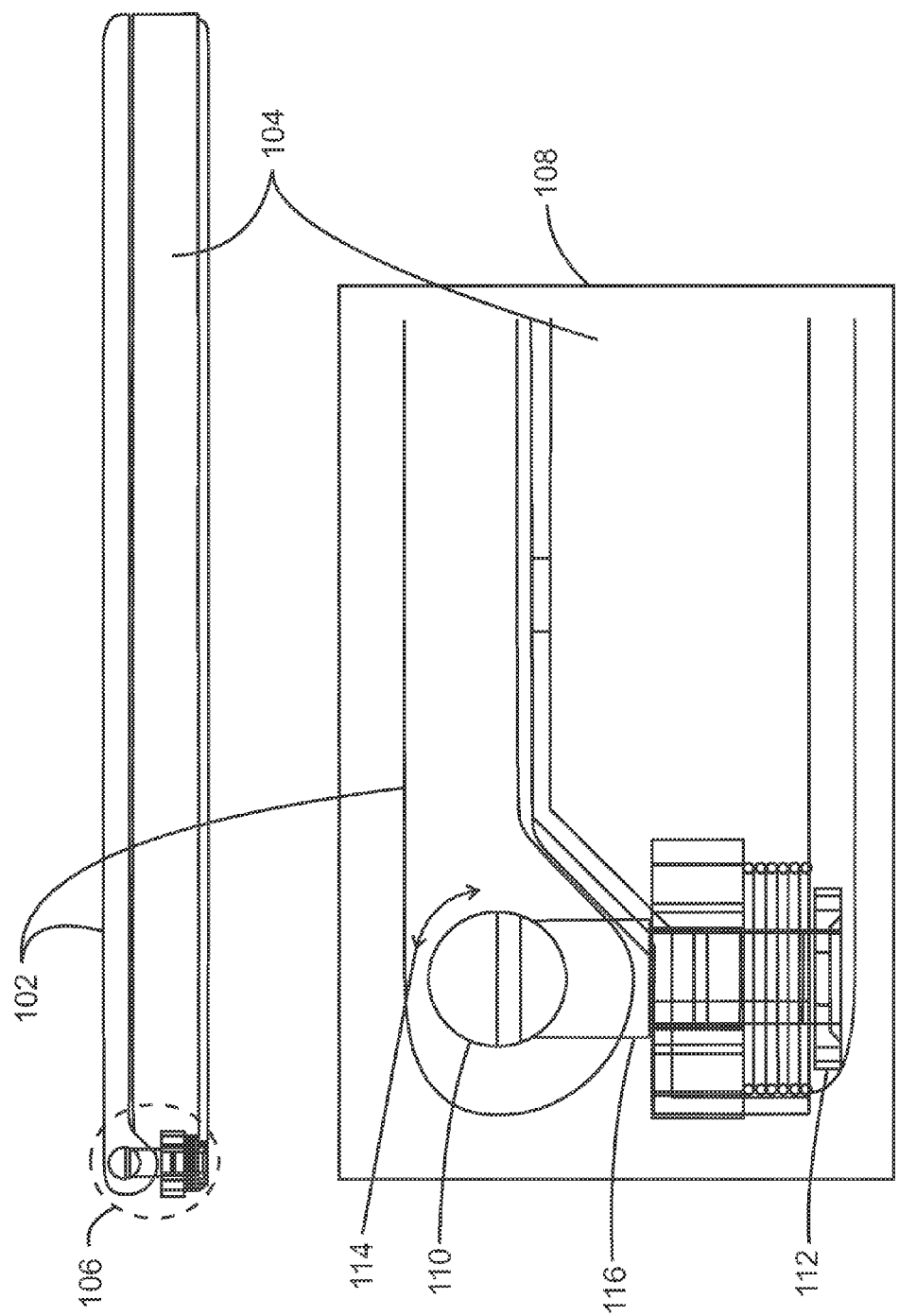
FIG. 1 is a diagram illustrating a side view of a computing device having a hinge.

FIG. 1 is a diagram illustrating a side view of a computing device having a hinge. The computing device 100 may include a first housing 102 and a second housing 104 coupled via a hinge, indicated by the dashed circle 106. The example computing device 100 illustrated in FIG. 1 is a laptop computing device, wherein the first housing 102 is a lid comprising a display, such as a touchscreen, and the second housing 104 is a base comprising an input device such as a display having a virtual keyboard, a physical keyboard, a touch pad, and the like. The computing device 100 may be configured to function as a laptop, or a tablet computing device, as discussed in more detail below.

The first housing 102 may be referred to herein as the lid 102, and the second housing 104 may be referred to herein as the base 104. However, other embodiments may include the hinge 106 coupling other housings, components, and the like of the computing device 100.

As illustrated at a close-up view of the hinge 106, indicated at 108, the hinge 106 may include a first component 110 disposed within the lid 102, and a second component 112 disposed within the base 104. As discussed in more detail below, in embodiments, the first component 110 may be a rod, or a cylindrical component, extending through the lid 102 such that when the lid 102 is opened, the lid 102 rotates around the first component 110, as indicated at 114. Although not indicated in FIG. 1, the first component 110 of the hinge 106 may include a frictional element such that the lid 102 may be held in a desired position after rotation performed by a user.

A third component 116 may connectively couple the first component 110 and the second component 112. In embodiments, the third component 116 is a cylinder having a spring mechanism enabling the lid 102 to be pulled up from the base 104, as discussed in more detail below.

FIGS. 2A-2C are diagrams illustrating the computing device with a lid of the computing device in various positions. As discussed above, the hinge 106 may have at least three degrees of freedom. In FIG. 2A, the lid 102 of the computing device is rotated as indicated at 202. The movement 202 may be rotational movement around an axis defined by the first component 110 discussed above. In embodiments, the axis is perpendicular to an axis, as illustrated at 208 of FIG. 2C, extending lengthwise at a center of a connecting component. In embodiments, the rotation 202 illustrated in FIG. 2A may be performed for multiple purposes, such as to open the computing device, or to adjust a viewing angle for a display disposed within the lid 102. In some aspects, the rotational movement of the lid 102 is around an axis defined by a centerline of the first component 110 discussed above in relation to FIG. 1.

At FIG. 2B, the lid 102 may be pulled up, as indicated at 204. In embodiments, the lid 102 may be pulled up by a user to initiate a rotational movement indicated at 206 in FIG. 2C. The movement 204 may be a linear movement in a direction along the axis 208 extending lengthwise at a center of a connecting component of the hinge 106, such as the third component 116 discussed above in regard to FIG. 1. At 206, the movement rotates the lid 102 around the axis 208 extending lengthwise at a center of the connecting component 116.

The embodiments illustrated in FIG. 2A, FIG. 2B, and FIG. 2C enable multiple degrees of freedom. Further, the embodiments illustrated in FIG. 2A and in FIG. 2B illustrate the computing device 100 in a laptop mode wherein a display of the lid 102 is facing the base 104. In laptop mode, the lid 102 may be supported by the hinge 106 as well as multiple contact points along the base. Specifically, rather than only providing support to the lid 102 via the hinge 106, the examples illustrated in FIG. 2A and FIG. 2B increase the points of contact between the lid 102 and the base 104 providing support of the lid 102 by the base 104.

Figure 3:
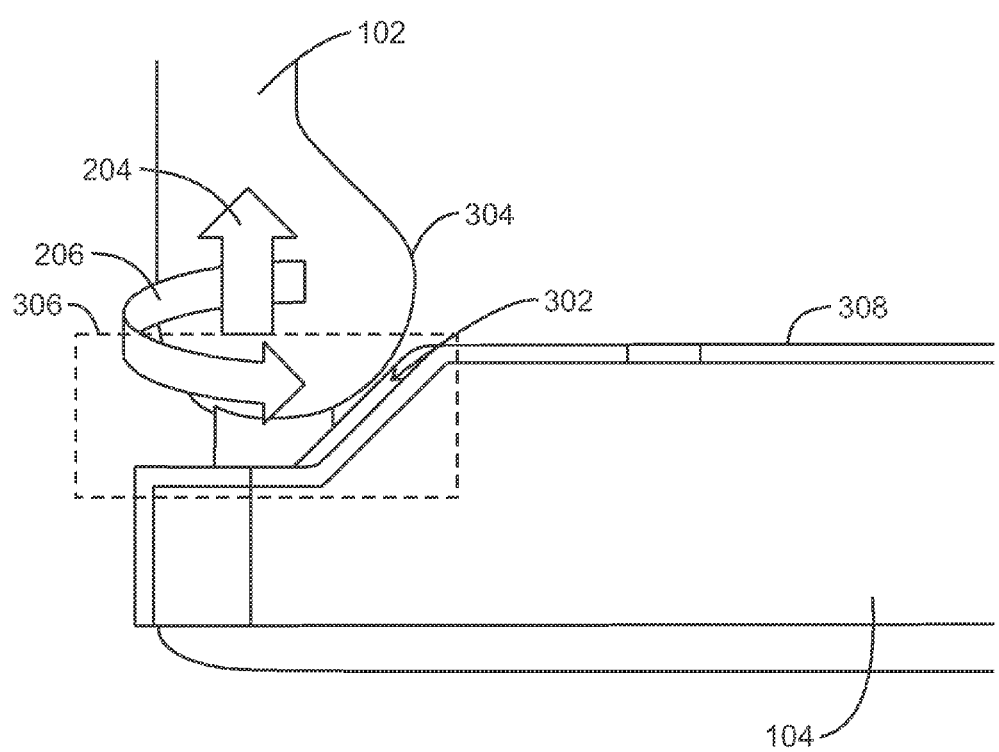
FIG. 3 is a diagram illustrating a side view of the computing device having a chamfered edge.

FIG. 3 is a diagram illustrating a side view of the computing device having a chamfered edge. The base 104 may include the chamfered edge 302 such that when rotational movement 206 is initiated, the linear movement 204 is also initiated. Specifically, the edge of the lid 102 may be rounded as indicated at 304, wherein rotational movement 206 of the lid 102 engages the rounded edge 304 and the chamfered edge 302 such that the lid begins to move up in the linear movement 204.

As illustrated in FIG. 3, the base 102 may include a depression 306 in comparison to a top surface 308 of the base 102. The depression 306 of the base 102 may enable the rounded edge 304 of the lid 102 to be received within the depression 306 when the lid 102 is closed, as illustrated in FIG. 1. In an open position, the rounded edge 304 may be received within the depression 306 such that contact between the lid 102 and the base 104 extends along the length of the interface between the lid 102 and the base 104. Further, the depression 306 may enable a shorter overall height of the computing device 100 when closed while including the chamfered edge 302 of the base 104 and the rounded edge 304 of the lid 102.

Figure 4:
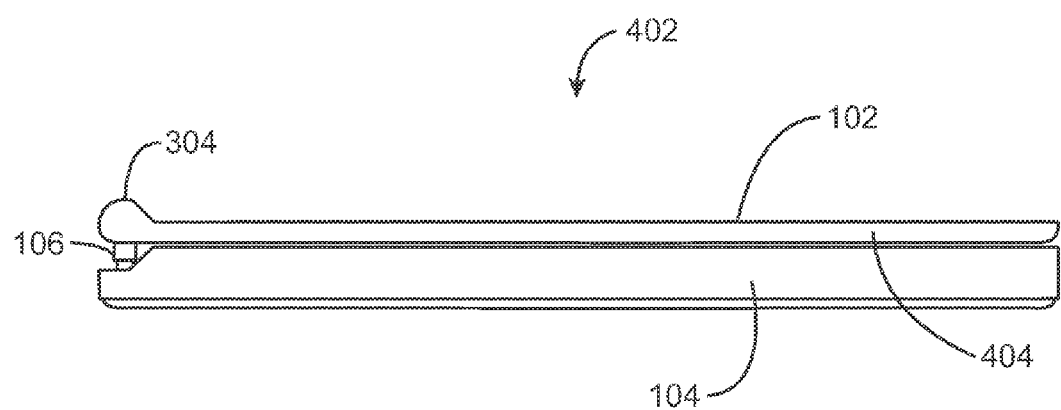
FIG. 4 is a side view of the computing device having a protruding rounded edge at a lid of the computing device.

FIG. 4 is a side view of the computing device having a protruding rounded edge at a lid of the computing device. As discussed above, the computing device 100 may be used in tablet mode, generally indicated at 402. In tablet mode 402, the lid 102, having a touchscreen is displayed, while a back 404 of the lid rests against the base 104. In this scenario, the rounded edge 304 may be a protruding rounded edge and used as a hand grip. In the tablet mode the connecting component of the hinge 106 is extended as illustrated in FIG. 4. In some examples, the hinge 106 may include a spring mechanism to apply resistive force to the hinge 106 when extended, such as when in the tablet mode 402.

Figure 5:
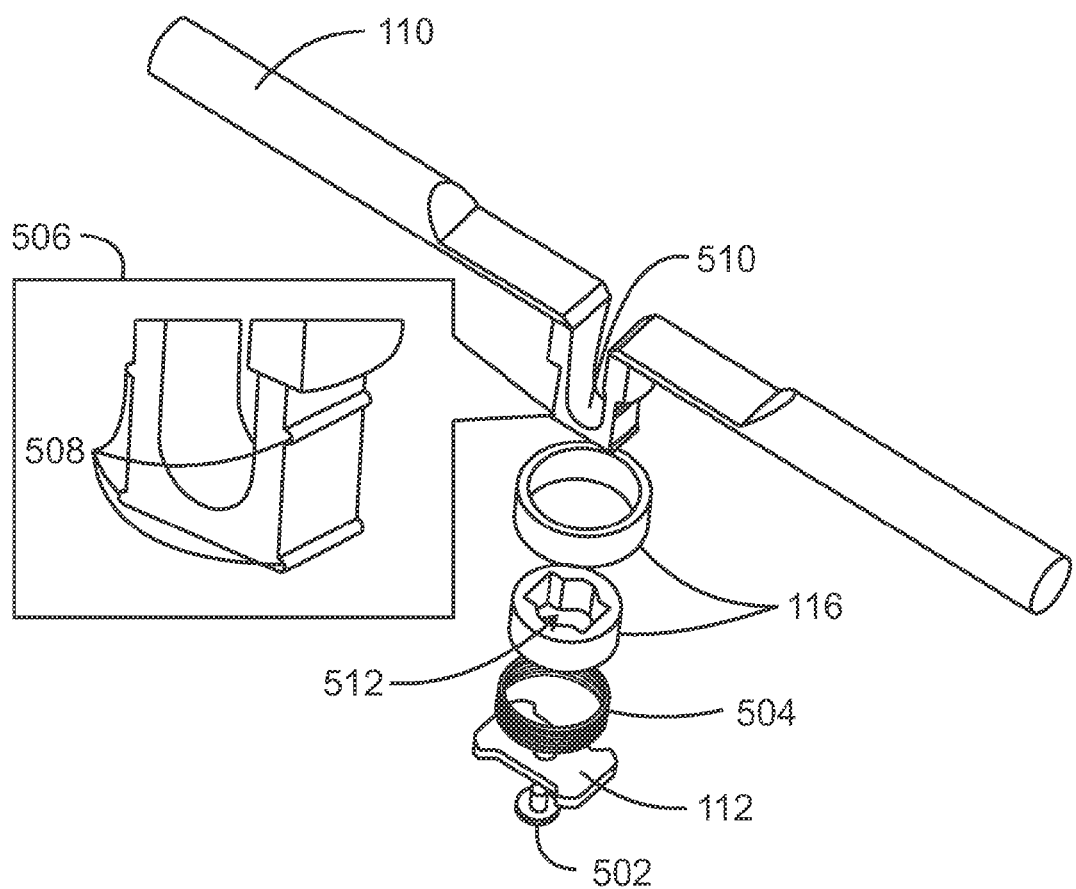
FIG. 5 is a perspective view of components of the hinge.

FIG. 5 is a perspective view of components of the hinge. As discussed above in reference to FIG. 1, the hinge 106 may include a first component 110, a second component 112, and a third component 114 connecting the first component 110 and the second component 116. The first component 110 may be a rod to be placed within the first housing 102. The second component 112 may be a fastening plate to be disposed within the second housing 104 via a fastening device, such as a screw 502. The third component 116 may include an outer ring and an inner ring configured to rotate when the first housing 102 is swiveled, as described above in regard to FIG. 2C. The hinge 106 may also include a spring 504 configured to resist upward linear movement, such as the linear movement 204 discussed above in reference to FIG. 2B. The first component 110 may also include a protruding portion indicated at 506. The protruding portion 506 may include rivets 508 configured to produce an audible click when pulled in the linear motion 204, such that a user may be alerted as to when linear motion 204 reaches a maximum or a minimum. The protruding portion 506 may also include a recess 510 configured to receive cabling through the inner ring of the third component 116, as indicated at 512.

Figure 6:
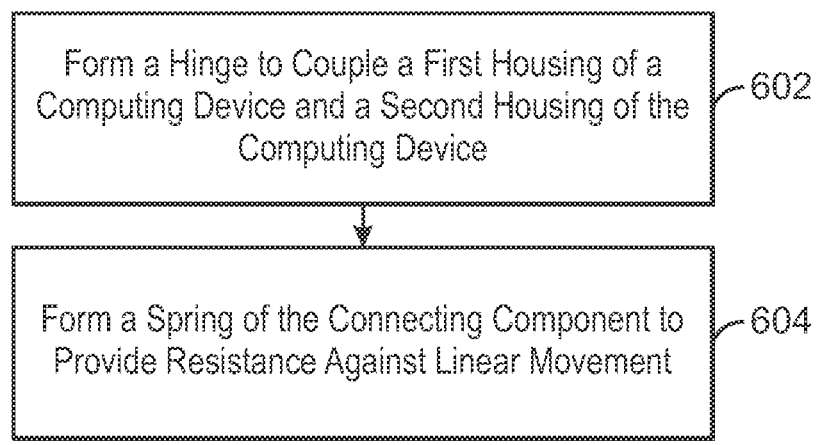
FIG. 6 is a block diagram illustrating a method of forming the hinge of the computing device.

FIG. 6 is a block diagram illustrating a method of forming the hinge of the computing device. At 602, a hinge is formed to couple a first housing of a computing device and a second housing of the computing device. The hinge is formed to have at least three degrees of freedom between the first housing and the second housing. The three degrees of freedom include linear movement and two types of rotational movement. Linear movement includes movement in a linear direction along an axis extending lengthwise at a center of a connecting component of the hinge connecting the first housing and second housing. A first rotational movement is movement of the first housing around the axis extending lengthwise at a center of a connecting component. A second rotational movement is movement of the first housing around an axis perpendicular to the axis extending lengthwise at a center of a connecting component.

In embodiments, the first housing to house a display of the computing device, and the second housing to house a base of the computing device having a keyboard. The method 600 may include forming a first component of the hinge disposed within the first housing, the first housing being rotatable around the first component, and forming a second component disposed within the second housing. The method 600 may also include forming a third component to connect the first component and the second component.

In embodiments, the method 600 includes forming a spring of the hinge to provide resistance against the linear movement. Depending on a given implementation, the spring may compress or expand in response to the linear movement. The spring may also provide tension between interfacing edges of the first housing and second housing.

EXAMPLE 1

A method of forming a coupling means is described herein. The coupling means, in some scenarios, may be a hinge configured to couple a first housing to a second housing. The coupling means has three degrees of freedom between the first housing and the second housing.

The three degrees of freedom include a first degree wherein linear movement in a direction along an axis extending lengthwise at a center of a connecting component of the hinge connecting the first housing and second housing. A second degree of freedom includes a rotational movement of the first housing around the axis extending lengthwise at a center of a connecting component. A third degree of freedom includes a rotational movement of the first housing around an axis perpendicular to the axis extending lengthwise at a center of a connecting component.

Forming the hinge may include forming a first component, a second component, and a third component. The first component is to be disposed within the first housing such that the first housing is rotatable around the first component of the hinge. The second component is to be disposed within the second housing, and may be a fastening device to fasten the second component to the second housing. The second component may also include a spring mechanism to apply a force in an opposite direction to movement of the first housing. The third component connects the first component and the second component. The third component may be a hollow cylinder wherein wires, or other communicatively coupling components, may pass through from second housing to the first housing.

EXAMPLE 2

An apparatus is described herein. The apparatus includes a hinge to couple a first housing means to a second housing means. The housing means are components of a computing device. In one scenario, the first housing means is a lid of a laptop computing device, and the second housing means is a base of the laptop. The hinge enables the lid to move with respect to the base in three degrees of freedom.

The three degrees of freedom include a first degree wherein linear movement in a direction along an axis extending lengthwise at a center of a connecting component of the hinge connecting the first housing and second housing. A second degree of freedom includes a rotational movement of the first housing around the axis extending lengthwise at a center of a connecting component. A third degree of freedom includes a rotational movement of the first housing around an axis perpendicular to the axis extending lengthwise at a center of a connecting component.

The hinge may include a first component, a second component, and a third component. The first component is to be disposed within the first housing such that the first housing is rotatable around the first component of the hinge. The second component is to be disposed within the second housing, and may be a fastening device to fasten the second component to the second housing. The second component may also include a spring mechanism to apply a force in an opposite direction to movement of the first housing. The third component connects the first component and the second component. The third component may be a hollow cylinder wherein wires, or other communicatively coupling components, may pass through from second housing to the first housing.

EXAMPLE 3

A system is described herein. The system includes a first housing and a second housing of a computing device. For example, the first housing may be a lid having a display of a laptop computer, while the second housing may be a base of the laptop computer. The system includes a hinge to couple the first housing and the second housing. The hinge has three degrees of freedom between the first housing and the second housing.

The three degrees of freedom include a first degree wherein linear movement in a direction along an axis extending lengthwise at a center of a connecting component of the hinge connecting the first housing and second housing. A second degree of freedom includes a rotational movement of the first housing around the axis extending lengthwise at a center of a connecting component. A third degree of freedom includes a rotational movement of the first housing around an axis perpendicular to the axis extending lengthwise at a center of a connecting component.

The hinge may include a first component, a second component, and a third component. The first component is to be disposed within the first housing such that the first housing is rotatable around the first component of the hinge. The second component is to be disposed within the second housing, and may be a fastening device to fasten the second component to the second housing. The second component may also include a spring mechanism to apply a force in an opposite direction to movement of the first housing. The third component connects the first component and the second component. The third component may be a hollow cylinder wherein wires, or other communicatively coupling components, may pass through from second housing to the first housing.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus, comprising a hinge to couple a first housing of a computing device and a second housing of the computing device, the hinge to provide at least three degrees of freedom between the first housing and the second housing, the at least three degrees of freedom comprising:
   rotational movement of the first housing around a first axis parallel to a long axis of the second housing, wherein the first axis is perpendicular to a second axis extending lengthwise at a center of a connecting component;
   linear movement along the second axis perpendicular to the first axis wherein the second axis extends lengthwise at the center of the connecting component of the hinge connecting the first housing and the second housing; and
   rotational movement of the first housing around the second axis extending lengthwise at the center of the connecting component,
   wherein the second housing comprises a chamfered edge, wherein rotational movement of the first housing around the second axis extending lengthwise at the center of the connecting component initiates the linear movement when an edge of the first housing engages with the chamfered edge during initial rotational movement.

2. The apparatus of claim 1, wherein at least one of the first and second housings to house a display of the computing device.

3. The apparatus of claim 1, comprising a spring to provide resistance against the linear movement.

4. The apparatus of claim 1, the hinge comprising:
a first component to be disposed within the first housing, the first housing being rotatable around the first component;
a second component to be disposed within the second housing; and
a third component to connect the first component and the second component.

5. The apparatus of claim 1, comprising:
a protruding rounded edge of the first housing of the computing device; and
a depression of the second housing of the computing device to receive the protruding rounded edge.

6. A system, comprising:
a first housing of a computing device;
a second housing of the computing device; and
a hinge to couple the first housing to the second housing of the computing device, the hinge to provide at least three degrees of freedom between the first housing and the second housing, the at least three degrees of freedom comprising:
rotational movement of the first housing around a first axis parallel to a long axis of the second housing, wherein the first axis is perpendicular to a second axis extending lengthwise at a center of a connecting component;
linear movement along the second axis perpendicular to the first axis wherein the second axis extends lengthwise at the center of the connecting component of the hinge connecting the first housing and the second housing; and
rotational movement of the first housing around the second axis extending lengthwise at the center of the connecting component,
wherein the second housing comprises a chamfered edge, wherein rotational movement of the first housing around the second axis extending lengthwise at the center of the connecting component initiates the linear movement when an edge of the first housing engages with the chamfered edge during initial rotational movement.

7. The system of claim 6, wherein at least one of the first and second housings to hold a display of the computing device.

8. The system of claim 6, wherein at least one of the first and second housings to house a processor of the computing device.

9. The system of claim 6, comprising a spring to provide resistance against the linear movement.

10. The system of claim 6, the hinge comprising a cylindrical element to be disposed within the first housing, wherein the rotational movement of the first housing around an axis perpendicular to the second axis extending lengthwise is an axis defined by a centerline of the cylindrical element.

11. The system of claim 6, the hinge comprising:
a first component disposed within the first housing, the first housing being rotatable around the first component;
a second component disposed within the second housing; and
a third component to connect the first component and the second component.

12. The system of claim 6, comprising:
a protruding rounded edge of the first housing of the computing device; and
a depression of the second housing of the computing device to receive the protruding rounded edge.

13. A method, comprising:
forming a hinge to couple a first housing of a computing device and a second housing of the computing device, the hinge to provide at least three degrees of freedom between the first housing and the second housing, the at least three degrees of freedom comprising:
rotational movement of the first housing around a first axis parallel to a long axis of the second housing, wherein the first axis is perpendicular to a second axis extending lengthwise at a center of a connection component;
linear movement along the second axis perpendicular to the first axis wherein the second axis extends lengthwise at the center of the connecting component of the hinge connecting the first housing and the second housing; and
rotational movement of the first housing around the second axis extending lengthwise at the center of the connecting component,
wherein the second housing comprises a chamfered edge, wherein rotational movement of the first housing around the second axis extending lengthwise at the center of the connecting component initiates the linear movement when an edge of the first housing engages with the chamfered edge during initial rotational movement.

14. The method of claim 13, wherein at least one of the first and second housings to house a display of the computing device.

15. The method of claim 13, comprising forming a spring to provide resistance against the linear movement.

16. The method of claim 13, wherein forming the hinge comprises:
forming a first component to be disposed within the first housing, the first housing being rotatable around the first component;
forming a second component to be disposed within the second housing; and
forming a third component to connect the first component and the second component.

17. The method of claim 13, comprising:
forming the first housing of the computing device having a protruding rounded edge; and
forming the second housing of the computing device having a depression to receive the protruding rounded edge.

* * * * *